US010063970B2

(12) United States Patent
Wippler

(10) Patent No.: US 10,063,970 B2
(45) Date of Patent: Aug. 28, 2018

(54) AUDIO SYSTEM WITH REMOVABLE SPEAKER

(71) Applicant: Toyota Motor Engineering & Manufacturing North America, Inc., Erlanger, KY (US)

(72) Inventor: Erik Anthony Wippler, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 197 days.

(21) Appl. No.: 14/824,557

(22) Filed: Aug. 12, 2015

(65) Prior Publication Data

US 2017/0048617 A1 Feb. 16, 2017

(51) Int. Cl.

*H04B 1/00* (2006.01)
*H04S 7/00* (2006.01)
*H04R 3/00* (2006.01)
*H04R 3/12* (2006.01)

(52) U.S. Cl.

CPC ............... *H04R 3/12* (2013.01); *H04S 7/305* (2013.01); *H04R 2499/13* (2013.01)

(58) Field of Classification Search

CPC .. G06F 17/3074; G06F 17/30743; G06F 3/16; G06F 3/165; H04R 2499/13; H04R 3/00; H04R 3/12; H04R 5/00; H04S 7/305

See application file for complete search history.

(56) References Cited

U.S. PATENT DOCUMENTS

| | | | | |
|---|---|---|---|---|
| 5,581,621 | A | 12/1996 | Koyama et al. | |
| 7,567,165 | B2 | 7/2009 | Epley | |
| 8,082,051 | B2 | 12/2011 | Mihelich et al. | |
| 8,103,008 | B2 | 1/2012 | Johnston | |
| 8,144,882 | B2 | 3/2012 | Christoph et al. | |
| 8,189,825 | B2 | 5/2012 | Breed | |
| 8,745,172 | B1 * | 6/2014 | Rowe | G06F 17/30743 709/219 |
| 9,253,560 | B2 * | 2/2016 | Goldstein | H04R 29/00 |
| 2004/0114771 | A1 | 6/2004 | Vaughan et al. | |
| 2008/0281197 | A1 * | 11/2008 | Wiley | A61B 8/4281 600/437 |
| 2009/0290725 | A1 | 11/2009 | Huang | |
| 2011/0137437 | A1 * | 6/2011 | Jonsson | G06F 3/167 700/94 |
| 2012/0254223 | A1 * | 10/2012 | Jotanovic | G06F 17/30749 707/769 |
| 2013/0332837 | A1 * | 12/2013 | Jarvinen | G06F 3/0488 715/727 |
| 2014/0077455 | A1 * | 3/2014 | Baker | A63F 3/0434 273/273 |
| 2014/0093107 | A1 | 4/2014 | Vu et al. | |

* cited by examiner

*Primary Examiner* — Thang Tran
(74) *Attorney, Agent, or Firm* — Dinsmore & Shohl LLP

(57) ABSTRACT

An audio system for use in an automotive vehicle is provided. The audio system is configured to detect the removal of the removable speaker and adjust the audio signal to the fixed speakers so as to maintain the quality of sound within the vehicle. The audio system includes a signal processor configured to detect the presence of the removable speaker. The audio system distributes the frequency transmitted to the removable speaker to the speakers within the automotive vehicle so as to maintain the same sound quality when the removable speaker is removed.

9 Claims, 7 Drawing Sheets

20a

| | Seats | | IP | | Doors | | Amp Tuning |
|---|---|---|---|---|---|---|---|
| | Leather | Cloth | Soft | Hard | Soft | Hard | |
| **North America** — Body ECU Options | ○ | | ○ | | ○ | | Tuning 1a |
| | | ○ | ○ | | ○ | | Tuning 2a |
| | | ○ | | ○ | ○ | | Tuning 3a |
| | | ○ | | ○ | | ○ | Tuning 4a |
| | | | | | | | Tuning Na |
| **China** — Body ECU Options | ○ | | ○ | | ○ | | Tuning 1b |
| | | ○ | ○ | | ○ | | Tuning 2b |
| | | ○ | | ○ | ○ | | Tuning 3b |
| | | ○ | | ○ | | ○ | Tuning 4b |
| | | | | | | | Tuning Na |
| **Europe** — Body ECU Options | ○ | | ○ | | ○ | | Tuning 1c |
| | | ○ | ○ | | ○ | | Tuning 2c |
| | | ○ | | ○ | ○ | | Tuning 3c |
| | | ○ | | ○ | | ○ | Tuning 4c |
| | | | | | | | Tuning Na |
| **Japan** — Body ECU Options | ○ | | ○ | | ○ | | Tuning 1d |
| | | ○ | | ○ | ○ | | Tuning 2d |
| | ○ | | ○ | | | ○ | Tuning 3d |
| | ○ | | | ○ | | ○ | Tuning 4d |
| | | | | | | | Tuning Na |
| ⋮ | ⋮ | ⋮ | ⋮ | ⋮ | ⋮ | ⋮ | ⋮ |

FIG. 3

North America

| | Seats | | IP | | Doors | | Amp Tuning |
|---|---|---|---|---|---|---|---|
| | Leather | Cloth | Soft | Hard | Soft | Hard | |
| Body North America Options | O | | O | | O | | Tuning 1a |
| | | O | O | | O | | Tuning 2a |
| | | O | | O | O | | Tuning 3a |
| | | O | | O | | O | Tuning 4a |
| | | | | | | | Tuning Na |

China

| | Seats | | IP | | Doors | | Amp Tuning |
|---|---|---|---|---|---|---|---|
| | Leather | Cloth | Soft | Hard | Soft | Hard | |
| Body China Options | ○ | | ○ | | ○ | | Tuning 1a |
| | | ○ | ○ | | ○ | | Tuning 2a |
| | | ○ | | ○ | ○ | | Tuning 3a |
| | | ○ | | ○ | | ○ | Tuning 4a |
| | | | | | | | Tuning Na |

20a

Europe

| | Seats | | IP | | Doors | | Amp Tuning |
|---|---|---|---|---|---|---|---|
| | Leather | Cloth | Soft | Hard | Soft | Hard | |
| Body Europe Options | ○ | | ○ | | ○ | | Tuning 1a |
| | | ○ | ○ | | ○ | | Tuning 2a |
| | | ○ | | ○ | ○ | | Tuning 3a |
| | | ○ | | ○ | | ○ | Tuning 4a |
| | | | | | | | Tuning Na |

Japan

| | Seats | | IP | | Doors | | Amp Tuning |
|---|---|---|---|---|---|---|---|
| | Leather | Cloth | Soft | Hard | Soft | Hard | |
| Body Japan Options | ○ | | ○ | | ○ | | Tuning 1a |
| | | ○ | ○ | | ○ | | Tuning 2a |
| | | ○ | | ○ | ○ | | Tuning 3a |
| | | ○ | | ○ | | ○ | Tuning 4a |
| | | | | | | | Tuning Na |

AUDIO SYSTEM WITH REMOVABLE SPEAKER

FIELD OF THE INVENTION

An audio system for use in an automotive vehicle is provided. More particularly, the audio system is configured to transmit a plurality of audio signals based upon the destination and vehicle settings so as to provide a predetermined audio output.

BACKGROUND OF THE INVENTION

Currently automotive vehicles are provided with an audio system having a signal processor configured to provide a predetermined audio signal. The audio signal is determined by the vehicle setting and the destination of the vehicle. In particular, the audio signal may be configured to account for vehicle settings (to include the various vehicle interior components) and the destination of the vehicle so as to provide a desired audio output.

It should be appreciated that materials may affect the audio output. Accordingly, the audio signal is tuned to account for the different interior components so as to generate a predetermined and desired audio output. Thus, manufacturers provide a plurality of different audio systems each of which is configured for a specific vehicle type and the destination of the vehicle type which may result in numerous different audio systems.

Accordingly, it remains desirable to have an audio system configured to be used in multiple vehicles arriving at multiple destinations so as to reduce the number of signal processors available to choose from thereby streamlining the manufacturing process and reducing cost.

SUMMARY OF THE INVENTION

An audio system for use in an automotive vehicle configured to generate one of a plurality of different audio outputs is provided. The audio system includes a signal processor and a database. The database includes a plurality of audio signals. The audio signals are associated with a geographic region. The geographic region is the region in which the vehicle is destined for sale. The audio system includes an input configured to select one of the geographic regions. The selected geographic region and the associated audio signal are transmitted to the signal processor. The signal processor generates a corresponding audio output so as to ensure that the vehicle has an audio output associated with the selected geographic region.

An automotive vehicle configured to generate one of a plurality of audio outputs is also provided. The automotive vehicle includes a signal processor and a database. The database includes a plurality of audio signals stored therein. Each of the audio signals is associated with a geographic region. An input is configured to select one of the geographic regions wherein the signal processor processes the audio signal associated with the selected geographic region so as to generate a corresponding audio output.

Further provided herein is a method of manufacturing an automotive vehicle so as to provide the automotive vehicle with an audio output associated with the geographic region of the automotive vehicle. The method includes the step of providing a signal processor and a database. The database stores a plurality of audio signals. Each of the audio signals is associated with a respective geographic region. The method proceeds to the step of providing an input configured to select one of the geographic regions. The method proceeds to the step of actuating the input so as to select the geographic region the automotive vehicle is destined to be sold in wherein the signal processor processes the audio signal associated with the selected geographic region so as to generate a corresponding audio output.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be better understood when read in conjunction with the following drawings where like structure is indicated with like reference numerals and in which:

FIG. 3 is an illustrative view showing the various geographic regions and vehicle settings;

DETAILED DESCRIPTION OF THE PREFERRED EMBODIMENTS

An audio system for use in an automotive vehicle is provided. The audio system is configured to generate one of a plurality of audio outputs so as to allow vehicles with different interior components and destined for different geographic regions to have a desired audio output. The audio system includes a signal processor such as an amplifier. A database including a plurality of audio signals may be stored in a body electronic control unit of the vehicle. Each of the audio signals is associated with a geographic region. The system further includes an input configured to select one of the geographic regions wherein the signal processor processes the audio signal associated with the selected geographic region so as to generate a corresponding audio output. Accordingly, the audio system allows manufacturers to install one amplifier for which the signals generated by the amplifier are provided by a database and which is appropriate to the interior components of the vehicle and the destination of the vehicle.

Figure 1:
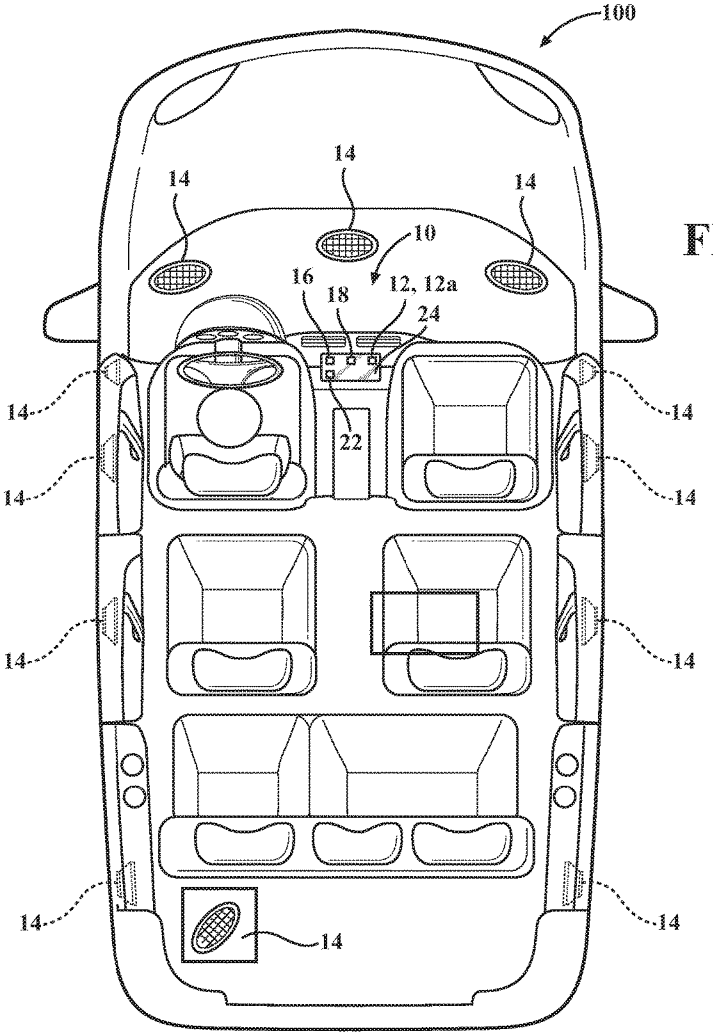
FIG. 1 is a top-down view of an automotive vehicle showing the audio system.

With reference now to FIG. 1, an illustrative view of an audio system 10 is provided. The audio system 10 is mounted within an automotive vehicle 100. The audio system 10 includes a digital signal processor 12. The digital signal processor 12 may be an amplifier **12*a*. The digital signal processor 12 processes an electrical signal and transmits the signals to the speakers 14 shown mounted at various locations of the vehicle. Each signal to a respective speaker 14 is configured to provide a predetermined audio output wherein the collective audio output of a respective speaker 14 provides the audio system 10 with a desired audio output. A database 16 is shown stored in a body electronic control unit 18. The body electronic control unit 18 is a processor configured to process and transmit signals from various electronic components. The database 16 includes a plurality of audio signals 20***a* (shown in FIGS. 2 and 3). Each of the audio signals 20*a* is associated with a geographic region. The audio system 10 may further include an input 22. The input 22 is configured to select one of the geographic regions. Upon actuation of the input 22, the digital signal processor 12 processes the audio signal 20*a* associated with the selected geographic region so as to generate a corresponding audio output 20*c* (shown in FIG. 2). It should be appreciated that the corresponding audio output 20*c* is an electrical signal sent to a respective speaker 14 and taken together produces the audio output. Thus, the electrical signal to a speaker 14 such as a tweeter may not necessarily be the same as an electrical signal transmitted to a subwoofer or a woofer.

Figure 2:
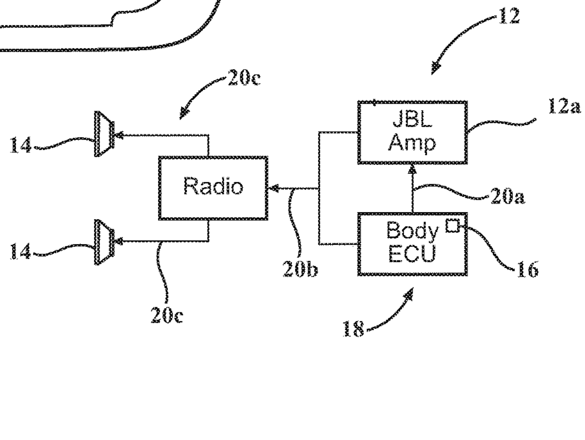
FIG. 2 is a schematic view showing the operation of the system.
Figure 4:
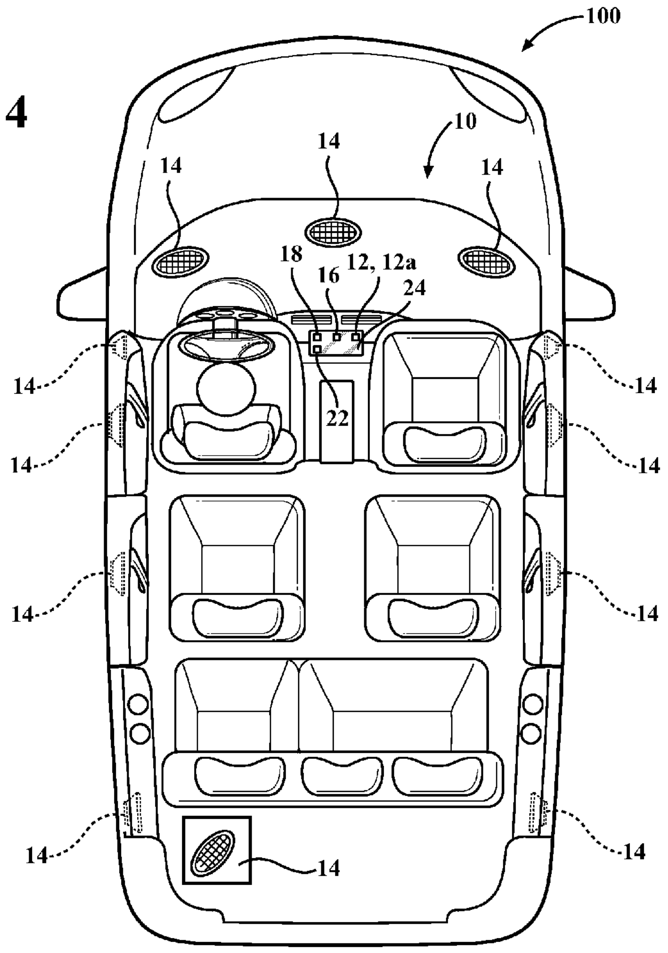
FIG. 4 is an illustrative view showing an automotive vehicle destined for North America.
Figure 5:
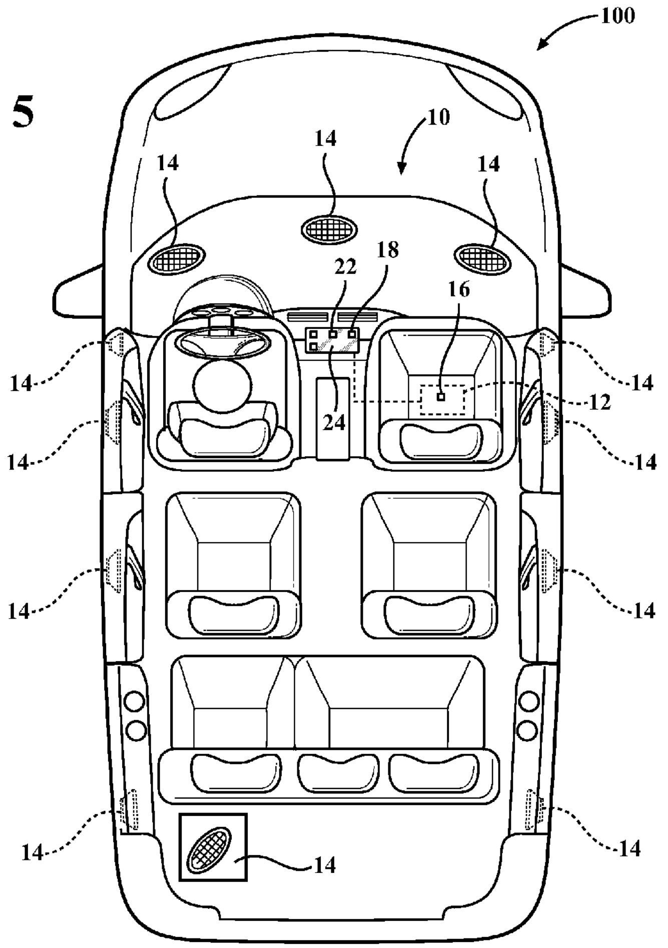
FIG. 5 is an illustrative view showing an automotive vehicle destined for China.
Figure 6:
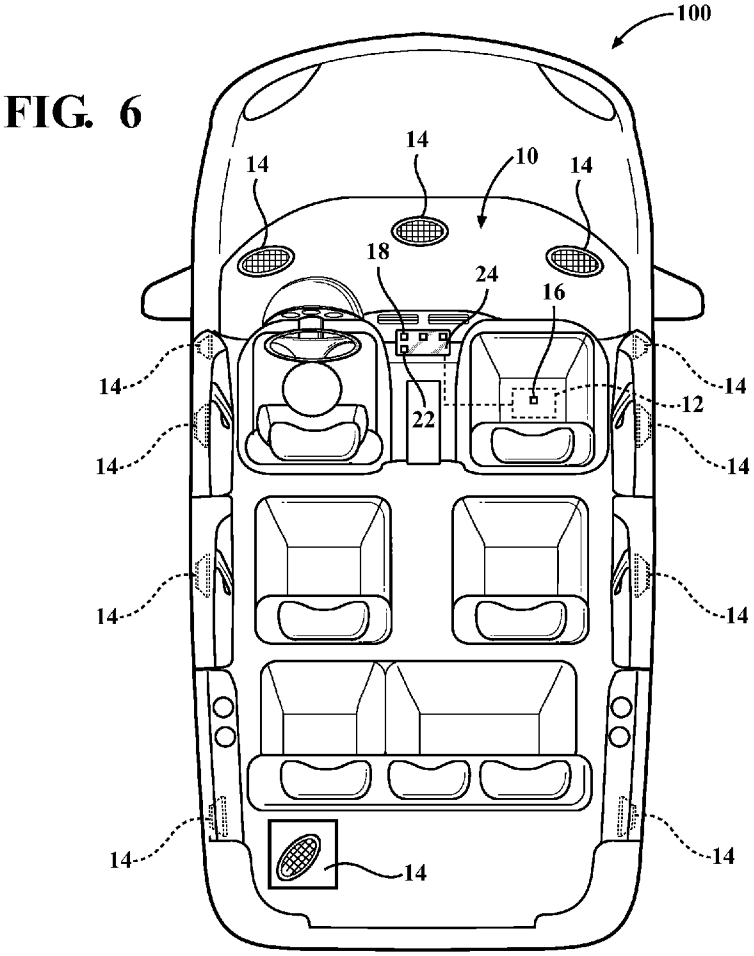
FIG. 6 is an illustrative view of an automotive vehicle destined for Europe.
Figure 7:
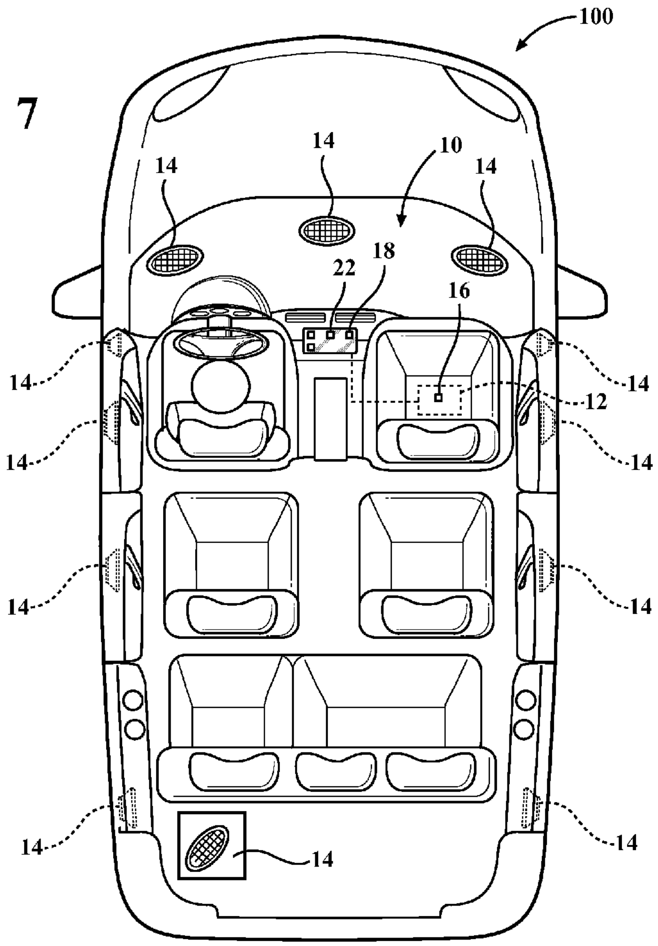
FIG. 7 is an illustrative view of an automotive vehicle destined for Japan.

With reference now to FIG. 2, a schematic diagram showing the operation of the audio system 10 is provided. As shown, the digital signal processor 12 receives the audio signal 20*a* from the body electronic control unit 18. The audio signal 20*a* is selected by the input 22 (shown in FIG. 1) based upon the geographic region of the vehicle and as described further below, may also include the interior components of the vehicle so as to provide the vehicle 100 with the corresponding audio output 20*c*. The selected audio signal 20*a* is then processed by the digital signal processor 12 and the digital signal processor 12 transmits a signal 20*b* to the radio or the speakers 14 to provide the corresponding audio output 20*c*.

FIG. 3 is a chart showing the various materials for certain interior components of the vehicle 100. It should be appreciated that the vehicles 100 may have different components for which different materials are used to make the components and the different materials provide different acoustic responses and thus having a common tuning for different interior components may result in different sound qualities. Accordingly, the audio system 10 is configured to provide the plurality of audio signals 20*a* based upon the different components within the vehicle 100 and each of which provides the same audio signals 20*a* for a specific geographic region. Thus, FIG. 3, for example, shows that the North American geographic region has the audio signal 20*a*, which in turn has the corresponding audio output 20*c* which is different than the audio signal 20*a* having the corresponding audio output 20*c* for China, Europe, and Japan. It should also be appreciated that North America has the corresponding audio output 20*c* that may be achieved by different audio signals 20*a*, which take into consideration the interior components. For example, the audio signal 20*a* for a seat formed of leather with a soft instrument panel and soft door trim has a first signal designated as tuning 1A whereas a vehicle 100 with cloth seats, a soft instrument panel, and soft door covers has an associated audio signal designated as tuning 2A. It should be appreciated that a vehicle 100 designated for North America will have the same corresponding audio output 20*c* when the associated audio signal 20*a* or tuning is used for the marked interior components. Thus, signals 1A and 2A produce the same audio signal 20*a* despite the fact that the signals are different as the signals account for the interior components. Accordingly, the audio system 10 allows the manufacturer to provide a single or common digital signal processor 12 for each vehicle 100 regardless of the differences in interior components and regardless of the destination of the vehicle 100. As illustratively shown in FIGS. 4-7, the audio system 10 provides a database 16 which may be written into the body electric control unit 18 of the vehicle 100 and the input 22 that selects the appropriate tuning and destination. Accordingly, the manufacturing cost and process is streamlined as the manufacturer no longer has to order different digital signal processors 12 for each vehicle 100 and does not have to remember which digital signal processor 12 is appropriate for a geographic region or vehicle setting.

Figure 8:
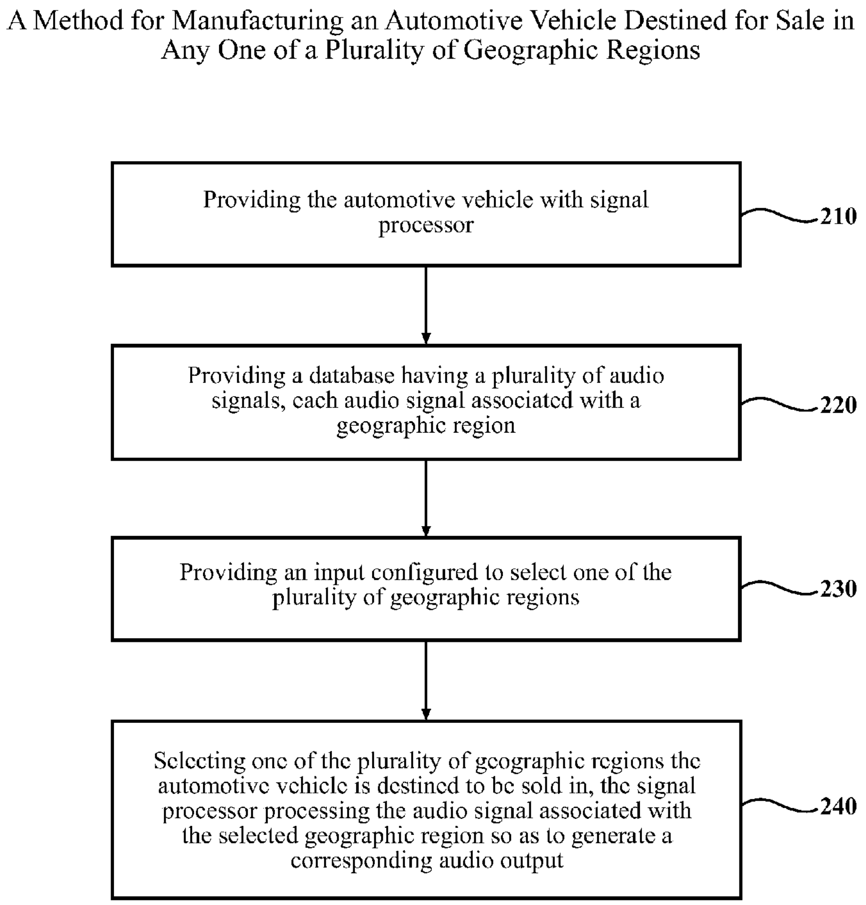
FIG. 8 is a diagram showing the steps for manufacturing an automotive vehicle.

With reference now to FIG. 8, a method for manufacturing an automotive vehicle 100 is provided. The method manufactures the automotive vehicle 100 so as to provide the automotive vehicle 100 with a corresponding audio output 20*c* associated with the geographic region the automotive vehicle 100 is destined for. The method proceeds with step 210 wherein a signal processor 12 is provided. The signal processor 12 may be a digital signal processor 12 such as an amplifier 12*a*. The method proceeds to step 220 of providing a database 16. The database 16 is configured to store a plurality of audio signals 20*a*. Each of the plurality of audio signals 20*a* is associated with a geographic region. The database 16 may be downloaded onto a body electronic control unit 18 of the automotive vehicle 100. The method proceeds to the step 230, providing an input 22. The input 22 is configured to select one of the geographic regions. The method proceeds to step 240, selecting the geographic region the automotive vehicle 100 is destined to be sold in wherein the signal processor 12 processes the audio signal 20*a* associated with the selected geographic region so as to generate a corresponding audio output 20*c* wherein the selection of the geographic region is completed before the automotive vehicle 100 leaves the manufacturing facility.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination.

I claim:

1. An audio system for use in an automotive vehicle, the audio system configured to generate one of a plurality of audio outputs, the audio system comprising:

a signal processor;

a database storing a plurality of audio signals, each of the plurality of audio signals associated with one of a plurality of geographic regions and one of a plurality of vehicle settings;

an input configured to select one of the plurality of geographic regions and one of the plurality of vehicle settings, the signal processor processing the audio signal associated with the selected geographic region and one of the plurality of vehicle settings so as to generate a corresponding audio output.

2. The audio system as set forth in claim 1, wherein the plurality of geographic regions include North America, South America, Europe, China, and Japan.

3. The audio system as set forth in claim 1, wherein the associated vehicle setting includes at least one from a list of associated vehicle setting consisting of: a material make-up of a seat, a material make-up of an instrument panel and a material make-up of a door.

4. An automotive vehicle configured to generate one of a plurality of audio outputs, the automotive vehicle comprising:

a signal processor;

a database storing a plurality of audio signals, each of the plurality of audio signals associated with one of a plurality of geographic regions and one of a plurality of vehicle settings;

an input configured to select one of the plurality of geographic regions and one of the plurality of vehicle settings, the signal processor processing the audio signal associated with the selected geographic region and one of the plurality of vehicle settings so as to generate a corresponding audio output.

5. The automotive vehicle as set forth in claim 4, wherein the geographic regions include North America, South America, Europe, China, and Japan.

6. The automotive vehicle as set forth in claim 5, wherein the associated vehicle settings include at least one from the list of associated vehicle settings consisting of: a material make-up of a seat, a material make-up of an instrument panel and a material make-up of a door.

7. A method of manufacturing an automotive vehicle so as to provide the automotive vehicle with an audio output associated with a geographic region of the automotive vehicle, the method comprising the step of:

providing a signal processor;

providing a database storing a plurality of audio signals, each of the plurality of audio signals associated with a geographic region;

providing an input configured to select one of a plurality of geographic regions and one of a plurality of vehicle settings;

selecting one of the plurality of geographic regions the automotive vehicle is destined to be sold in and one of a plurality of vehicle settings, the signal processor processing the audio signal associated with the selected geographic region and the selected vehicle setting so as to generate a corresponding audio output.

8. The method of manufacturing an automotive vehicle as set forth in claim 7, wherein the geographic regions include North America, South America, Europe, China, and Japan.

9. The method of manufacturing an automotive vehicle as set forth in claim 8, wherein the associated vehicle settings include at least one from the list of associated vehicle settings consisting of: a material make-up of a seat, a material make-up of an instrument panel and a material make-up of a door.

* * * * *